United States Patent [19]
McPherson

[11] Patent Number: 6,113,174
[45] Date of Patent: Sep. 5, 2000

[54] PIPE SUPPORT

[76] Inventor: Grant Harland McPherson, Box 6691, Drayton Valley, Alberta, Canada, T7A 1S2

[21] Appl. No.: 08/962,934

[22] Filed: Oct. 28, 1997

[30] Foreign Application Priority Data

Nov. 22, 1996 [CA] Canada ................................ 2191043

[51] Int. Cl.⁷ ............................................. B62D 33/02
[52] U.S. Cl. ...................... 296/26.15; 296/38; 296/182
[58] Field of Search .................... 296/26.15, 38, 296/182

[56] References Cited

U.S. PATENT DOCUMENTS

| | | |
|---|---|---|
| 882,743 | 3/1908 | Carroll ........................ 296/38 |
| 1,053,795 | 2/1913 | Ellis ............................ 296/38 |
| 1,091,321 | 3/1914 | Pleury ......................... 296/38 |
| 1,704,917 | 3/1929 | McCullough et al. ...... 296/38 |
| 3,043,386 | 7/1962 | Marion et al. ............. 296/26.15 |
| 5,271,657 | 12/1993 | Lockett . |
| 5,667,267 | 9/1997 | Talucci ..................... 296/26.15 |

Primary Examiner—Gary C. Hoge
Attorney, Agent, or Firm—Davis and Bujold

[57] ABSTRACT

A pipe support for use in oil well servicing includes a catch basin. A deck overlies the catch basin. The deck has a plurality of drain openings whereby liquids on the deck drain down into the catch basin. By catching liquids, such as oil, the pipe support prevents environmental contamination at the well site.

14 Claims, 4 Drawing Sheets

PIPE SUPPORT

FIELD OF THE INVENTION

The present invention relates to a pipe support for use when servicing oil wells.

BACKGROUND OF THE INVENTION

When servicing an oil well, lengths of pipe and rods are pulled from the wellbore. At the present time these lengths of pipe and rods are laid on the ground. This is undesirable for a number of reasons. The lengths of pipe and rods have just been removed from an oil environment. When these oil covered lengths of pipe and rods are laid onto the ground they create an environmental hazard. When servicing is complete, these lengths of pipe and rods must be inserted back into the wellbore. Each of the lengths of pipe have a threaded box connection at one end and a threaded pin connection at the other end. As they are inserted back into the wellbore lengths of pipe are connected together by mating the threads of the pin connection of one length of pipe with the threads of the box connection of an adjacent length of pipe. When the lengths of pipe are laid onto the ground the threads become contaminated with sand and grit. This sand and grit adversely effects sealing of the connections and contributes to excessive and premature wear.

SUMMARY OF THE INVENTION

What is required is a pipe support that can be moved on site when servicing an oil well in order to address the above described problems.

According to the present invention there is provided a pipe support which includes a catch basin. A deck overlies the catch basin. The deck has a plurality of openings whereby liquids on the deck pass into the catch basin. It is preferred that the deck have a gridiron surface that enables particulate matter as well as liquids to pass into the catch basin.

With the pipe support, as described above, the pipe is supported off the ground so that threads of the pipe do not become contaminated. In addition, the provision of the catch basin ensures that any oil from the pipe is contained, so that any environmental contamination is avoided.

Although beneficial results may be obtained through the use of the pipe support, as defined above, even more beneficial results may be obtained when the catch basin is mounted on a trailer. This facilitates transport of the catch basin to remote sites.

Although beneficial results may be obtained through the use of the pipe support, as described above, even more beneficial results may be obtained when the trailer has a pair of wing sections. Each of the wing sections are movable between a substantially vertical stored position and a substantially horizontal operative position. The provision of wings, as described, enables the overall surface area of the pipe support to be enlarged. Each wing section has a first end, a second end, and a bottom. It is preferred that the bottom is downwardly sloped from the first end to the second end such that liquids tend to migrate from the first end to the second end. It is also preferred that the catch basin have a primary pull out tray and each of the wing sections have a secondary pull out tray. Each of the secondary pull out trays have a drainage outlet. Each of the secondary pull out trays overhang the primary pull out tray, such that liquids reaching the drainage outlets of the secondary pull out trays drain into the primary pull out tray. The primary pull out tray is kept clear by means of a vacuum pump unit mounted on a truck. Such vacuum pump units are generally present when an oil well is being serviced.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
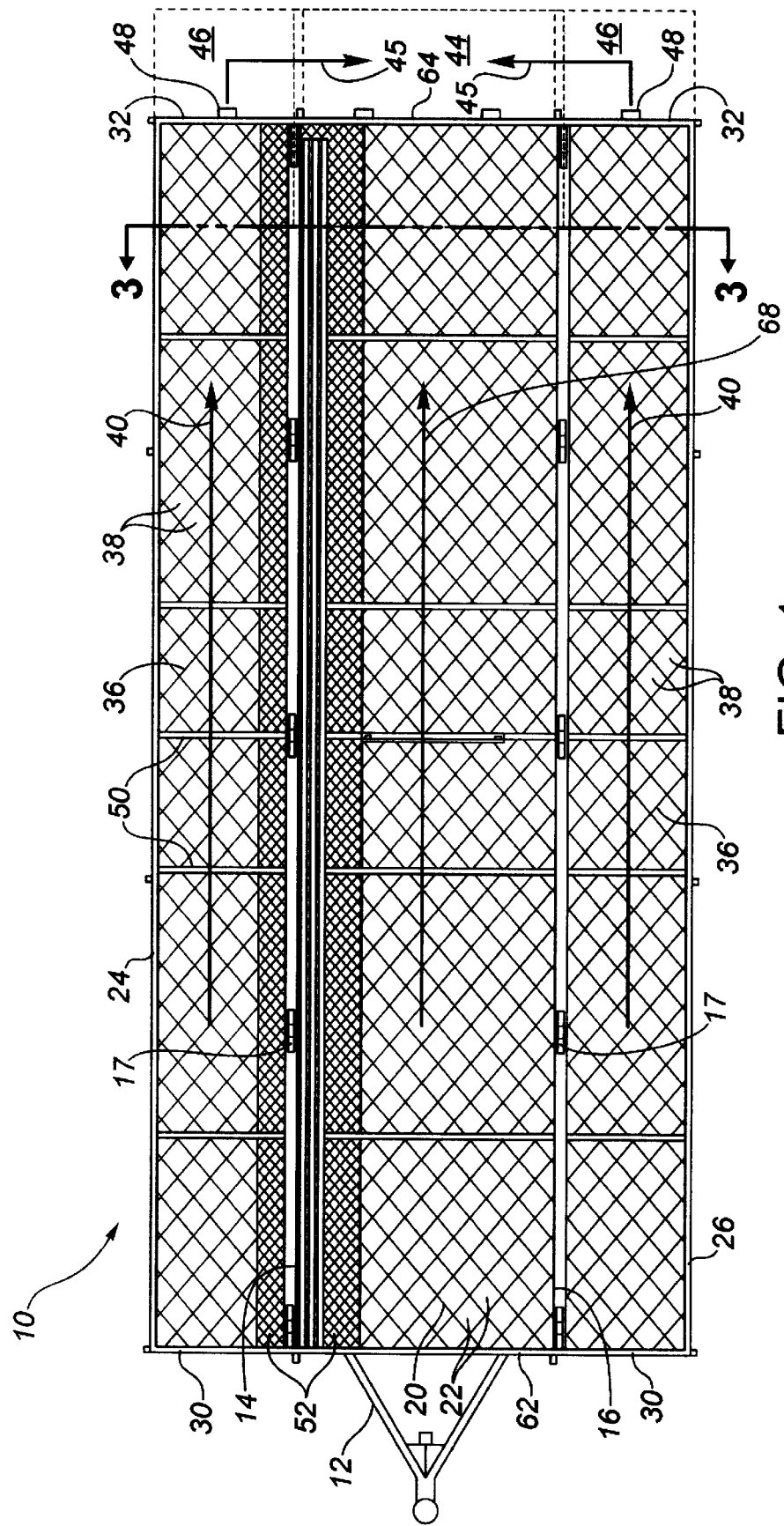
FIG. 1 is a top plan view of a pipe support constructed in accordance with the teachings of the present invention.

The preferred embodiment, a pipe support generally identified by reference numeral 10, will now be described with reference to FIGS. 1 through 4.

Figure 2:
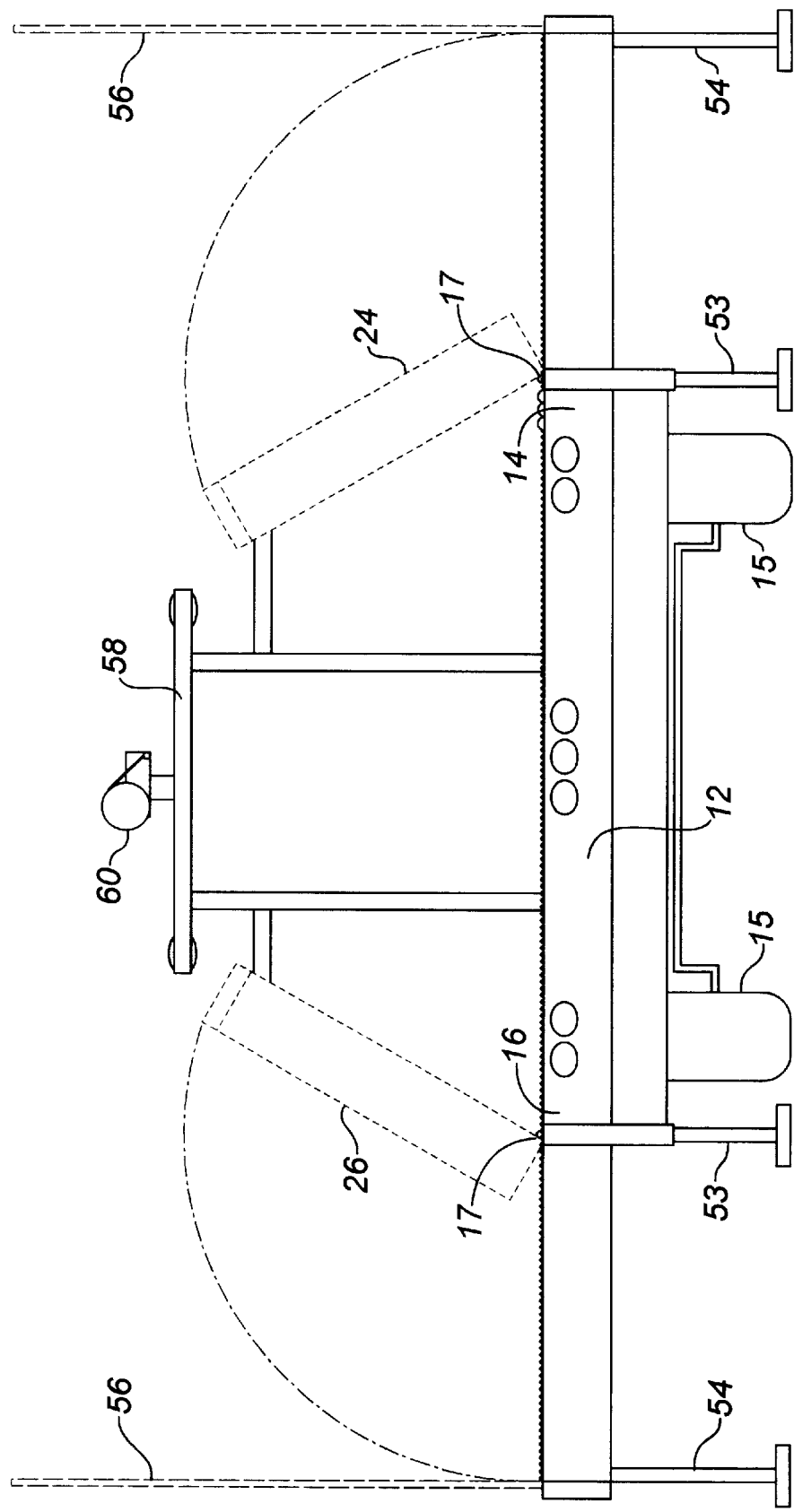
FIG. 2 is an end elevation view of the pipe support illustrated in FIG. 1.
Figure 3:
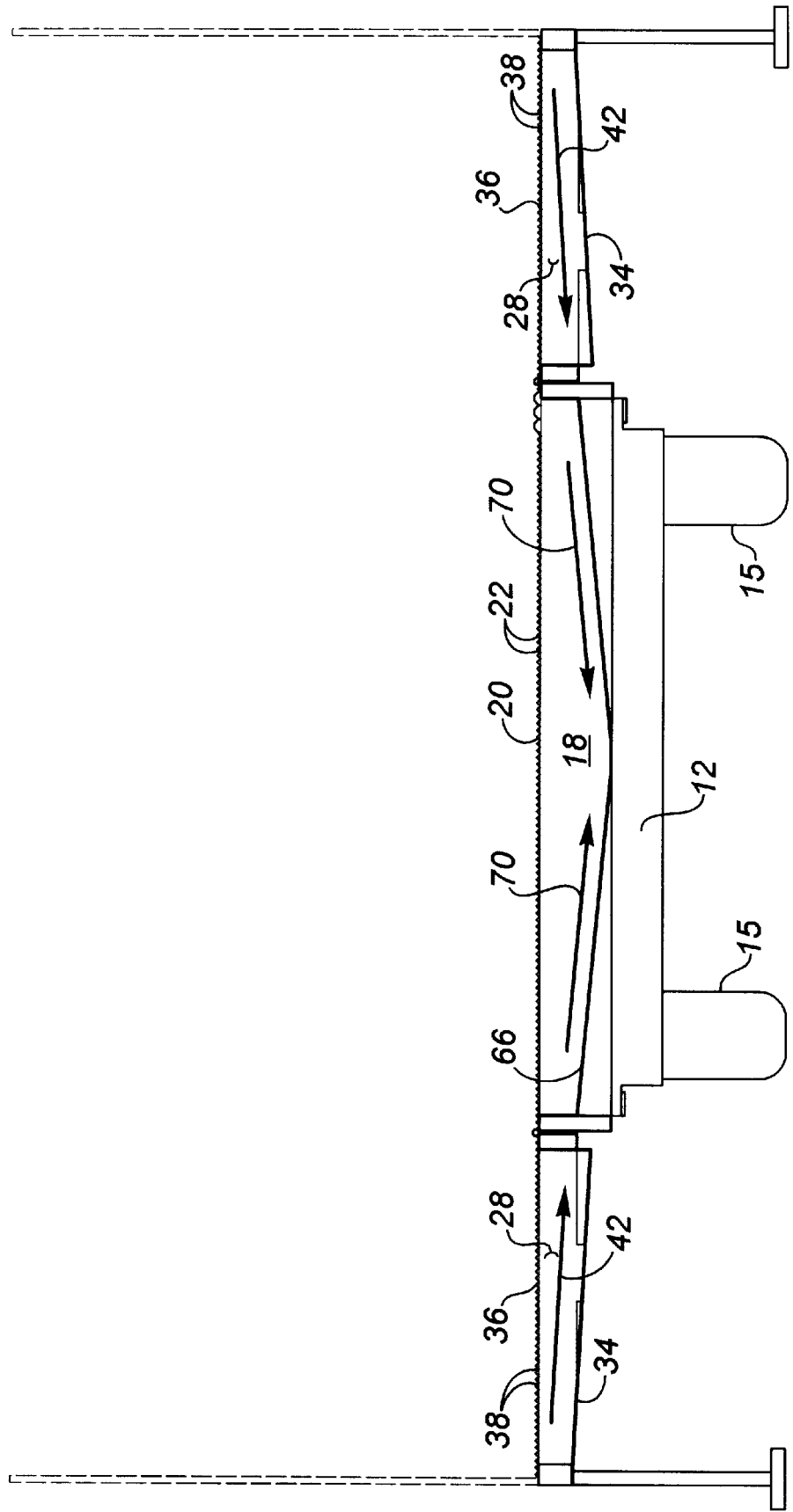
FIG. 3 is a transverse section view taken along section lines A—A of FIG. 1.
Figure 4:
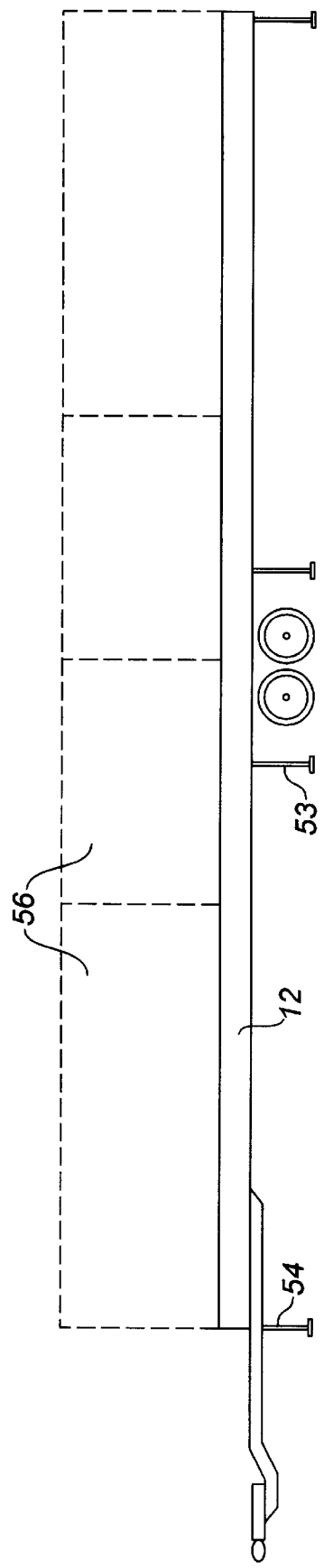
FIG. 4 is a side elevation view of the pipe support illustrated in FIG. 2.

Referring to FIG. 1, pipe support 10 includes a trailer 12 having opposed sides 14 and 16. Referring to FIGS. 2 through 4, trailer 12 has ground engaging wheels 15. Referring to FIG. 3, a primary catch basin 18 is mounted on trailer 12. A gridiron primary deck 20 overlies catch basin 18. Deck 20 has a plurality of drain openings 22, whereby liquids and particulate matter on deck 20 pass down into primary catch basin 18. Referring to FIG. 2, a pair of wing sections 24 and 26 are pivotally secured to opposed sides 14 and 16, respectively, of trailer 12 by means of hinge assemblies 17. Each of wing sections 24 and 26 are movable between a substantially vertical stored position and a substantially horizontal operative position. Each of wing sections 24 and 26, preferably includes a secondary catch basin 28 having a first end 30, a second end 32. Referring to FIG. 3, secondary catch basin 28 has a bottom 34. Each of wing sections 24 and 26 including a gridiron secondary deck 36 having a plurality of drain openings 38, whereby liquids and particulate matter on secondary deck 36 drain down into secondary catch basins 28. Referring to FIG. 1, bottom 34 of each of secondary catch basins 28 is downwardly sloped from first end 30 to second end 32, such that liquids entering secondary catch basins 28 tend to migrate from first end 30 to second end 32. The direction of migration of liquids is shown by arrows 40. Referring to FIG. 3, bottom 34 is also sloped to promote a migration of liquids toward trailer 12, as shown by arrows 42. Referring to FIG. 1, a primary pull out tray 44 is provided on primary catch basin 18. Secondary pull out trays 46 are provided on each of secondary catch basins 28. Each of secondary pull out trays 46 have a drainage outlet 48. Each of secondary pull out trays 46 overhang primary pull out tray 44, such that liquids reaching drainage outlets 48 of secondary pull out trays 46 drain into primary pull out tray 44, as indicated by arrows 45, and from primary pull out tray 44 into primary catch basin 18. The surface of primary deck 20 and secondary decks 36 are supported by an underlying support structure 50. The surface of primary deck 20 and secondary decks 36 have reinforced walking areas 52. Referring to FIG. 2, trailer 12 has telescopically extendible weight-bearing support legs 53 and wing sections 24 and 26 also have support legs 54. Referring to FIGS. 2 through 4, trailer 12 has removable side panels 56. Referring to FIG. 2, a winch support structure 58 is removably mounted to primary deck 20 of trailer 12. Winch support structure 58 supports a winch 60. Referring to FIG. 1, primary catch basin 18 has a first end 62 and a second end 64. Referring to FIG. 3, primary catch basin 18 has a bottom 66. Referring to FIG. 1, bottom 66 is downwardly sloped from first end 62 to second end 64 such that liquids tend to migrate from first end 62 to second end 64. The direction of migration of liquid is shown by arrow 68. Referring to FIG. 3, bottom 66 is also inwardly sloped from its outer edges toward the middle, to promote an inward migration of liquid as shown by arrows 70.

The use and operation of pipe support 10 will now be described with reference to FIGS. 1 through 4. Referring to FIG. 2, trailer 12 is used to pull primary catch basin 18 along rural highways to the site of the well that is to be serviced. As trailer 12 is being pulled, wing sections 24 and 26 are maintained in the substantially vertical stored position. Once at the servicing site, wing sections 24 and 26 are moved to the substantially horizontal operative position. Support legs 53 and 54 are deployed in order to provide support to trailer 12 and wing sections 24 and 26, respectively. Support legs 53 prevent undue weight from being placed upon wheels 15. Support legs 54 prevent undue stress from being placed upon hinge assemblies 17. Pipe (not shown) is loaded onto primary deck 20 as it is removed from the well, and rod (not shown) is similarly loaded onto secondary deck 36. Referring to FIG. 4, side panels 56 are optional. They are be placed in position if a washing of the pipe and rod is to be done. Referring to FIG. 1, primary pull out tray 44 and secondary pull out trays 46 are deployed prior to pipe or rod being loaded. Oil dripping from rods stacked upon secondary deck 36 passes through openings 38 and enters secondary catch basins 28. Once in secondary catch basin 38 the oil tends to migrate from first end 30 to second end 32, following a path indicated by arrows 40. When the oil reaches drainage outlets 48 of secondary pull out trays 46, the oil drains into primary pull out tray 44, as indicated by arrows 45, and from primary pull out tray 44 it is removed by means of a truck mounted vacuum pump unit (not shown). Oil dripping from pipe stacked upon primary deck 20 passes through openings 26 into primary catch basin 18. Once in primary catch basin 18, the oil tends to migrate from first end 62 to second end 64, as indicated by arrow 68. The oil drains into primary pull out tray 44, where it is removed by means of the truck mounted vacuum pump unit. When the servicing of the well is completed, trailer 12 is moved back into a transport mode and removed from the well site.

It will be apparent to one skilled in the art that modifications may be made to the illustrated embodiment without departing from the spirit and scope of the invention as hereinafter defined in the Claims.

What is claimed is:

1. A pipe support, comprising:
   a catch basin; and
   a deck overlaying the catch basin, the deck consisting of a gridiron surface supported by an underlying support structure and having a plurality of openings whereby liquids on the deck drain down into the catch basin.

2. The pipe support as defined in claim 1, wherein the catch basin is mounted on a trailer, thereby facilitating transport to remote sites.

3. The pipe support as defined in claim 1, wherein the catch basin has a first end, a second end, and a bottom, the bottom being downwardly sloped from the first end to the second end such that liquids tend to migrate from the first end to the second end.

4. The pipe support as defined in claim 1, wherein the trailer has a pair of wing sections, each of the wing sections being movable between a substantially vertical stored position and a substantially horizontal operative position.

5. The pipe support as defined in claim 4, wherein each of the wing sections having a first end, a second end, and a bottom, the bottom being downwardly sloped from the first end to the second end such that liquids tend to migrate from the first end to the second end.

6. The pipe support as defined in claim 5, wherein the catch basin has a primary pull out tray and at least one of the wing sections has a secondary pull out tray, each of the secondary pull out trays having a drainage outlet, each of the secondary pull out trays overhanging the primary pull out tray, such that liquids reaching the drainage outlets of the secondary pull out trays drain into the primary pull out tray.

7. A pipe support, comprising:
   a trailer having opposed sides;
   a primary catch basin mounted on the trailer;
   a deck overlying the catch basin, the deck having a plurality of drain openings whereby liquids on the deck drain down into the primary catch basin;
   a pair of wing sections pivotally secured to the opposed sides of the trailer, each of the wing sections being movable between a substantially vertical stored position and a substantially horizontal operative position, each of the wing sections including a secondary catch basin having a first end, a second end, and a bottom, each of the wing sections including a secondary deck having a plurality of drain openings whereby liquids on the secondary deck drain down into the secondary catch basins, the bottom of each of the secondary catch basins being downwardly sloped from the first end to the second end such that liquids entering the secondary catch basins tend to migrate from the first end to the second end;
   a primary pull out tray on the catch basin and secondary pull out trays on each of the secondary catch basins, each of the secondary pull out trays having a drainage outlet, each of the secondary pull out trays overhanging the primary pull out tray, such that liquids reaching the drainage outlets of the secondary pull out trays drain into the primary pull out tray.

8. The pipe support as defined in claim 7, wherein the deck consists of a gridiron surface supported by an underlying support structure.

9. The pipe support as defined in claim 8, wherein the gridiron surface has reinforced walking areas.

10. The pipe support as defined in claim 7, wherein the wing sections have support legs.

11. The pipe support as defined in claim 7, wherein the trailer has support legs.

12. The pipe support as defined in claim 7, wherein the trailer has removable side panels.

13. The pipe support as defined in claim 7, wherein a winch support structure is removably mounted to the deck of the trailer, the winch support structure supporting a winch.

14. The pipe support as defined in claim 7, wherein the catch basin has a first end, a second end, and a bottom, the bottom being downwardly sloped from the first end to the second end such that liquids tend to migrate from the first end to the second end.

* * * * *